April 18, 1961   G. K. GROETZINGER ET AL   2,980,807
BISTABLE ELECTRICAL CIRCUIT
Filed Sept. 17, 1957

*INVENTORS*
GERHART K. GROETZINGER
PHILIP SCHWED
LOUIS WITTEN
BY
Julian C. Renfro
ATTORNEY

United States Patent Office 2,980,807
Patented Apr. 18, 1961

2,980,807

BISTABLE ELECTRICAL CIRCUIT

Gerhart K. Groetzinger and Philip Schwed, Baltimore, and Louis Witten, Baltimore County, Md., assignors to The Martin Company, a corporation of Maryland Filed Sept. 17, 1957, Ser. No. 684,610

9 Claims. (Cl. 307—88.5)

The present invention relates to an improved bistable electrical circuit employing the operating principle of a cryotron, and more particularly to such a circuit wherein a single switching element is adapted to assume both stable states.

The cryotron, a device based on the destruction of superconductivity by a magnetic field, is well known in the art, and is described in an article by D. A. Buck published in the Proceedings of the Institute of Radio Engineers, volume 44, April 1956.

Briefly, a cryotron comprises a switching element which may assume a superconducting state in which its electrical resistance is zero (hereinafter designated $R_0$) or a normal state in which its electrical resistance is other than zero (hereinafter designated $R_n$). To this end the switching element is made of a material which, in the absence of a magnetic field, enters into a superconducting state when brought below a critical temperature. In the operation of the cryotron the switching element is always maintained below this critical temperature. In this way the switching element can be brought into its normal state from the superconducting state by the application of a magnetic field of sufficient magnitude. To effect a change from one state to the other the cryotron includes a control winding disposed around the switching element. The magnetic field created by the control winding may be varied in magnitude and polarity by the value and direction of the current flowing therethrough.

The use of the cryotron element in a bistable electrical circuit is described in the above-referenced article. The circuit there illustrated in Fig. 3 employs the conventional coupled pair of identical switching elements so interconnected that current conduction through one prevents current conduction through the other, thus establishing two stable states.

It is the primary object of the present invention to provide an improved bistable electrical circuit wherein, contrary to the said conventional practice, only a single switching element need be employed to establish both stable states.

To this end, in the improved circuit the switching element and control winding of a cryotron are connected to form a series circuit with a voltage source V, and a resistive element R. The series circuit thus produces and applies a magnetic field to the switching element in proportion to the current flow therethrough. The invention further provides that the switching element be disposed within an additional and separate constant magnetic field $H_a$. This field may be generated by any conventional means.

With this improved circuit, stability in either state of the switching element may be effected by an appropriate selection of the values of V and R. Such selection is defined by the equations:

$$V = I_0(R + R_k + R_0)$$
$$V = I_n(R + R_k + R_n)$$

where:

$R_k$ is the resistance of the cryotron control winding,
$I_0$ is equal to a value of current through the series circuit for generating a magnetic field which, in combination with the magnetic field $H_a$, produces a net magnetic field $H < H_c$,
$I_n$ is equal to a value of current through the series circuit for generating a magnetic field which, in combination with the magnetic field $H_a$, produces a net magnetic field $H > H_c$, and
$H_c$ is equal to a critical magnitude of the net magnetic field H at which the switching element changes from one state to another.

The bistability of the improved circuit is explained by an analysis of the effects of the currents $I_0$ and $I_n$. A current $I_0$ through the series circuit causes the net field H to be smaller than $H_c$, which in turn causes the switching element to assume its superconducting state with a resistance $R_0$, which in turn sustains the current flow $I_0$. On the other hand, a current $I_n$ through the series circuit causes the net field H to be greater than $H_c$, which in turn causes the switching element to assume its normal state with a resistance $R_n$, which in turn sustains the current flow $I_n$. Thus the switching element in either of its states remains in such state unless disturbed by an external influence. Such an external influence may be a temporary magnetic field applied to the switching element and having the proper magnitude and polarity to shift the prevailing magnetic field from one side of $H_c$ to the other.

The invention can best be understood by referring to the following drawings in which.

Figure 1:
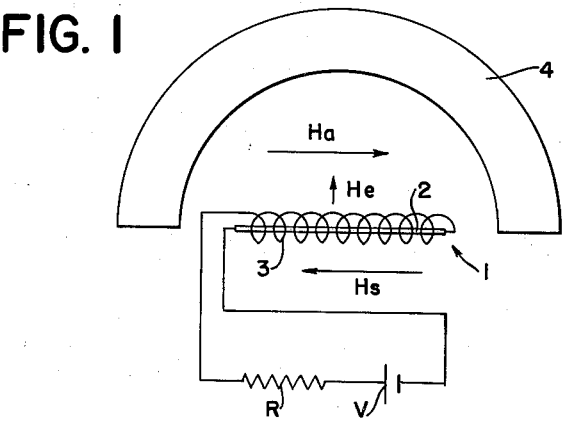
Fig. 1 is a schematic diagram of a bistable electrical circuit in accordance with the invention.

Referring to Fig. 1 the bistable electrical circuit comprises two basic electrical units. The first unit is a series circuit which includes a cryotron 1 comprising a switching element 2 and a control winding 3. The switching element is made of material characterized by a superconducting state with a resistance $R_0$ and a normal state with a resistance $R_n$. The control winding is wrapped about the switching element so that current passing therethrough applies a magnetic field $H_s$ substantially parallel to the axis of the switching element. The remainder of the series circuit comprises a resistive element R and a voltage source V. The second unit comprises a means, in this case a permanent magnet 4, for producing a permanent magnetic field $H_a$ substantially parallel to the axis of the switching element. The voltage source V is connected so that the field $H_s$ opposes the field $H_a$.

Preliminary to describing the operation of the circuit it is necessary to point out a few of the characteristics of the cryotron element which are pertinent to the invention. These characteristics are more fully explained in the article by D. A. Buck. One such characteristic is the so-called self-field of the cryotron switching element. This field is caused by current flow through the switching element 2 and is therefore tangential thereto as represented by $H_e$ in Fig. 1. The net field produced by current flow in the series circuit is therefore due to a quadrature addition of the magnetic fields $H_s$ and $H_e$. In this context another characteristic which needs mention is that the control effect of a net magnetic field applied to a switching element is a function only of its magnitude and is independent of its vector direction. Additionally the maximum magnitude of a magnetic field at any point on the cross-section of a switching element occurs at its periphery.

It is therefore readily seen that at the periphery of the switching element 2 the magnitude of the net magnetic field H is given by the equation:

$$H=\sqrt{(H_a-H_s)^2+H_e^2}$$

Let us now assume that the operating temperature of the switching element is selected so that the transition from state to state occurs when the applied magnetic field passes through a critical magnitude $H_c$. This temperature selection thus establishes the operating parameters of the bistable circuit in that the switching element will be in its normal state when the net field H is greater than $H_c$, and in its superconducting state when the net field H is less than $H_c$.

In order that the two states of the system may both be self-sustaining and stable, the invention employs the constant magnetic field $H_a$. The field created by current flow through the series circuit is then employed to switch the magnitude of the net magnetic field H to one side of $H_c$ or the other. To this end the field $H_a$ is made equal to or greater than $H_c$ in magnitude.

Before proceeding further it should be mentioned that the field $H_a$ is also subject to an upper limit due to the self-field $H_e$. Thus if $H_a$ is made larger than this as yet undefined upper limit, any current flow capable of reducing the magnitude of the field $(H_a-H_s)$ below $H_c$ will at the same time produce a self-field $H_e$ large enough to sustain the net field above $H_c$ making a transition below $H_0$ impossible. To define this upper limit of $H_a$ reference is made to the above-derived equation:

$$H=\sqrt{(H_a-H_s)^2+H_e^2}$$

The $H_e$ term may be stated in terms of $H_s$ as follows:

$$H_e=\lambda H_s$$

where:
$\lambda$ is approximately $1/(2\pi rn)$
$n$ being the number of turns per unit length of the control winding, and
$r$ the radius of the switching element.

It then follows that $$H^2=H_a^2-2H_sH_a+H_s^2(1+\lambda^2)$$

and that there exists a real value of $H_s$ such that the net field H can be reduced to a value smaller than $H_c$ providing the value of $H_a$ satisfies the equation:

$$H_a^2<(1+1/\lambda^2)H_c^2$$

Thus the upper limit of $H_a$ is equal to $$H_c\sqrt{1+1/\lambda^2}$$

Figure 2:
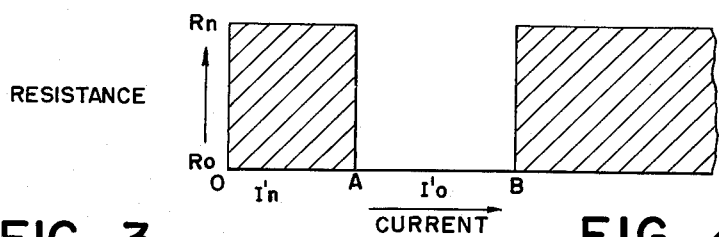
Fig. 2 is a graph of current versus resistance in the circuit of Fig. 1.

The phenomenon of bistability within the circuit of the invention is best described by referring to Fig. 2 which is a graph of the resistance of the switching element versus the current flow through the series circuit. The graph illustrates that with no current in the series circuit the net field H is due entirely to the permanent field $H_a>H_c$ and therefore the switching element is in its normal state. As the current through the series circuit is increased from zero a critical point A is reached where the field created by the current reduces the net magnetic field H below $H_c$. At this point A the switching element becomes superconducting and its resistance drops from $R_n$ to $R_0$. As the current is further increased a second critical point B is reached where the field created by the current through the series circuit becomes so large as to again raise H to a magnitude larger than $H_c$. At this point B the switching element returns to its normal state with a resistance $R_n$.

It can now be shown that a proper value selection of R and V will make the circuit of Fig. 1 stable in either of the two states. Referring to the graph of Fig. 2, let $I_n$ be any current between the points O and A, and $I_0$, any current between the points A and B. We can then derive two equations defining V and R as follows:

In the superconducting state $$V=I_0(R+R_k+R_0)$$

In the normal state $$V=I_n(R+R_k+R_n)$$

where:
$R_k$ is equal to the resistance of the control winding.

In the usual case, however, $R_0$ and $R_k$ may be ignored. This is due to the fact that the winding coil is ordinarily made of material which is superconducting at the temperature of operation throughout the range of the applied magnetic fields. In that case both $R_0$ and $R_k$ represent the resistance of a superconducting element.

Ignoring $R_k$ and $R_0$ and solving the two above equations simultaneously results in the following values for R and V:

$$R=I_nR_n/(I_0-I_n)$$
$$V=I_0I_nR_n/(I_0-I_n)$$

With these values of R and V the current flowing through the series circuit at any time is of such a value as to sustain itself and the then prevailing conductive state of the switching element. Thus a current $I_n$ causes the net field H to be greater than $H_c$, which in turn causes the switching element to be in its normal state, which in turn sustains the current flow $I_n$. On the other hand, a current $I_0$ causes the net field H to be less than $H_c$, which in turn causes the switching element to be in its superconducting state, which in turn sustains the current flow $I_0$. In this way the circuit of Fig. 1 will remain in either of its bistable states unless disturbed by an external influence.

It should be noted at this point that the embodiment of Fig. 1 is merely illustrative and is subject to many modifications which fall within the scope of the invention. For example, the fields $H_a$ and $H_s$ need not be parallel to the axis of the switching element. The circuit remains operative for any other field orientation through the upper limit of the field $H_a$ as hereinbefore derived would be changed. In addition, a control winding having the appropriate resistance may conceivably be selected so that a physically separate resistive element need not be employed.

Figure 3:
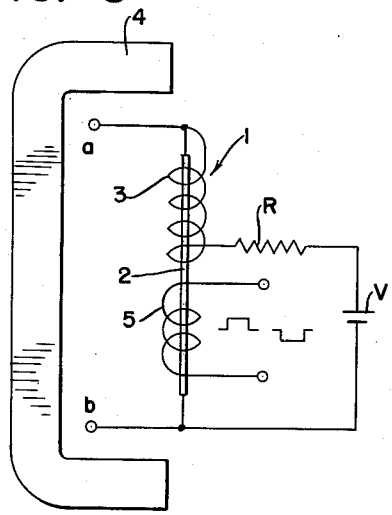
Fig. 3 is a schematic diagram illustrating a switching means for the bistable electrical circuit of Fig. 1.

Fig. 3 illustrates a means for switching the bistable circuit of Fig. 1 from one of its stable states to another. The switching means comprises a coil 5 wound around the switching element 2. All the circuit elements other than the switching coil 5 are the same as in Fig. 1 and are identically numbered. For the sake of clarity the switching coil 5 and control winding 3 are shown wound around different sections of the switching element. In practice, however, the control winding is advantageously wound along the entire length of the switching element, and the switching coil is wound about the outside of the control winding also along the entire length of the switching element. This gives a more nearly uniform field along the switching element when either winding is excited.

To effect switching the coil 5 is adapted to apply a temporary magnetic field to the switching element in such a direction as to either reinforce or subtract from the net magnetic field H depending upon the prevailing state of the bistable circuit. Thus if the switching element is in its superconducting state the prevailing net magnetic field will be smaller in magnitude than $H_c$. To switch the bistable circuit from this superconducting state the switching coil 5 is adapted to reinforce the net magnetic field to a value greater than $H_c$ long enough for the switching element to shift to its normal state. The temporary field may then be removed since the circuit will sustain itself in this new state. On the other hand, a subtraction of the temporary magnetic field from the net magnetic field is employed to effect switching if the switching element is originally in its normal state.

A pulse generator is advantageously connected to the coil 5 to produce the temporary magnetic field. This generator should be designed to generate pulses having the proper magnitude, polarity, and duration to produce a temporary magnetic field large enough, in the proper direction, and of a long enough duration to effect the switching operation.

The circuit of Fig. 3 is advantageously employed as a binary memory unit. In such operation the information to be remembered is provided in the form of a pulse of current sent into the switching coil 5, the polarity of the pulse determining the final state of the system regardless of its previous state. Thus if the information to be stored is that associated with the superconducting state of the bistable circuit the polarity of the pulse in the switching coil has to be such as to cause subtraction from the net magnetic field. Furthermore the magnitude of this pulse should be limited sufficiently so that if the bistable system is already in its superconducting state prior to the introduction of the pulse the magnetic field produced will not exceed the value $H_c$ at any time during the pulse's duration. On the other hand, if the information to be stored is that associated with the normal state of the system the polarity of the pulse in the switching coil 5 has to be such as to reinforce the net magnetic field. The output of the bistable circuit may then be taken from across the terminals $a$ and $b$. This output will be zero if the switching element is in its superconducting state and different from zero if the switching element is in its normal state.

Figure 4:
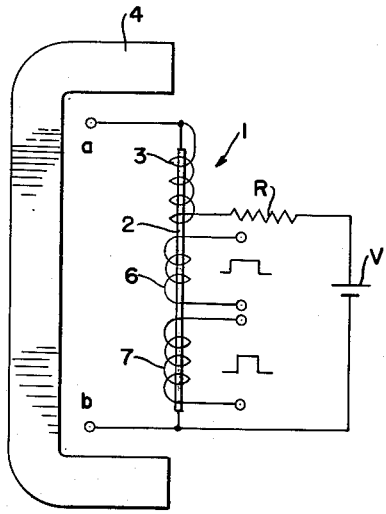
Fig. 4 is a schematic diagram illustrating an alternative switching means for the bistable electrical circuit of Fig. 1.

In Fig. 4 an alternative switching embodiment is illustrated. Components similar to those of Fig. 2 are identically numbered. In this embodiment two switching coils 6 and 7 are wound about the switching element 2 in such a manner as to be opposite in polarity. Again all of the windings are advantageously wound about the entire length of the switching element one on top of the other. The use of the two coils 6 and 7 avoids the necessity of employing pulses of opposite sign as in Fig. 3. In this case the desired shift in state may be effected by the application of a pulse to the appropropriately wound switching coil.

It should be noted that switching may be effected without the addition of switching coils to the circuit of Fig. 1, in that the necessary pulses could be introduced into the control winding 3, or into the switching element itself, via an appropriate condenser network.

Preferred embodiments of the invention have been described. Various changes and modifications may be made in the scope of the invention as set forth in the appended claims.

We claim:

1. A bistable electrical circuit comprising, a single cryotron having a switching element characterized by a superconducting state with a resistance $R_0$ and a normal state with a resistance $R_n$, and a control winding for generating and applying a magnetic field $H_s$ to said switching element, said switching element being adapted to pass from said superconducting state to said normal state in response to the increase of an applied magnetic field through a preselected critical magnitude $H_c$, means for generating and applying a magnetic field $H_a$ to said switching element equal to or greater than $H_c$ in magnitude, a voltage source V, and a resistive element R, said switching element, control winding, voltage source, and resistive element being connected in series circuit relation, the values of V and R in said series circuit being defined by the equations:

$$V = I_0(R + R_k + R_0)$$
$$V = I_n(R + R_k + R_n)$$

whereby the said circuit is stable with the said switching element in either its superconducting or normal state, where:

$R_k$ is the resistance of the said control winding,
$I_0$ is equal to a value of current through said series circuit for generating a magnetic field which, in combination with said magnetic field $H_a$ produces a net magnetic field $H < H_c$, and
$I_n$ is equal to a value of current through said series circuit for generating a magnetic field which, in combination with said magnetic field $H_a$, produces a net magnetic field $H > H_c$.

2. A bistable electrical circuit in accordance with claim 1 in which the said magnetic fields $H_a$ and $H_s$ are applied parallel to said switching element.

3. A bistable electrical circuit in accordance with claim 1 in which further comprises means for applying a temporary magnetic field to said switching element to switch said element from one state to another.

4. A bistable electrical circuit in accordance with claim 3 in which said switching means comprises a coil wound about said switching element, and a pulse generator connected to apply pulses of current to said coil.

5. A bistable electrical circuit in accordance with claim 3 in which said switching means comprises a pair of coils wound about said switching element in polarity opposition.

6. A bistabel electrical circuit comprising, a single cryotron having a switching element characterized by a superconducting state with a resistance $R_0$ and a normal state with a resistance $R_n$, and a control winding for generating and applying a magnetic field $H_s$ to said switching element, said switching element being adapted to pass from said superconducting state to said normal state in response to the increase of an applied magnetic field through a preselected critical magnitude $H_c$, means for generating and applying a magnetic field $H_a$ to said switching element equal to or greater than $H_c$ in magnitude, said magnetic field $H_s$ being oriented so as to at least partially oppose said magnetic field $H_a$, a voltage source V, and a resistance element R, said switching element, control winding, voltage source, and resistive element being connected in series circuit relation, said series circuit relation being such that when the total resistance of said series circuit includes said resistance $R_n$, the magnitude of said magnetic field $H_s$ will be sufficiently low so that the combination thereof with said magnetic field $H_a$ will produce a resutlant magnetic field greater than $H_c$ thereby establishing a first stable state for said electrical circuit, whereas when the total resistance of said series circuit includes said resistance $R_0$, the magnitude of said magnetic field $H_s$ will be sufficiently high so that the combination thereof with said magnetic field $H_a$ will produce a resultant magnetic field less than $H_c$ thereby maintaining a second stable state for said electrical circuit.

7. A bistable electrical circuit in accordance with claim 6 which further comprises means for applying a temporary magnetic field to said switching element to switch said element from one state to another.

8. A bistable electrical circuit comprising, a single cryotron having a switching element characterized by a superconducting state with a resistance $R_0$ and a normal state with a resistance $R_n$, a control winding for generating and applying a magnetic field $H_s$ to said switching element, said switching element being adapted to pass from said superconducting state to said normal state in response to the increase of an applied magnetic field through a preselected critical magnitude $H_c$, means for generating and applying a magnetic field $H_a$ to said switching element equal to or greater than $H_c$ in magnitude, and a voltage source V, said switching element, control winding, and voltage source being connected in series circuit relation, the values of V and R in said series circuit being defined by the equations:

$$V = I_0(R + R_0)$$
$$V = I_n(R + R_n)$$

whereby the said circuit is stable with said switching element in either its superconducting or normal state, where:

R is the resistance of the said series circuit less the resistance of the said switching element, $I_0$ is equal to a value of current through said series circuit for generating a magnetic field which, in combination with said magnetic field $H_a$, produces a net magnetic field $H < H_c$, and $I_n$ is equal to a value of current through said series circuit for generating a magnetic field which, in combination with said magnetic field $H_a$, produces a net magnetic field $H > H_c$.

9. A bistable electrical circuit comprising, a single cryotron having a switching element characterized by a superconducting state with a resistance $R_0$ and a normal state with a resistance $R_n$, and a control winding for generating and applying a magnetic field $H_s$ parallel to said switching element, said switching element being adapted to pass from said superconducting state to said normal state in response to the increase of an applied magnetic field through a preselected critical magnitude $H_c$, means for generating and applying a magnetic field $H_a$ parallel to said switching element and having a magnitude defined by the equation:

$$H_c^2 < H_a^2 < (1 + 4\pi^2 r^2 n^2) H_c^2$$

where:

$r$ is the radius of the said switching element, and $n$ is the number of turns per unit length of the said control winding, a voltage source V, and a resistive element R, said switching element, control winding, voltage source, and resistive element being connected in series circuit relation, the value of V and R in said series circuit being defined by the equations:

$$V = I_0(R + R_k + R_0)$$
$$V = I_n(R + R_k + R_n)$$

whereby the said circuit is stable with said switching element in either its superconducting or normal state, where:

$R_k$ is the resistance of the said control winding, $I_0$ is equal to a value of current through said series circuit for generating a magnetic field which, in combination with said magnetic field $H_a$, produces a net magnetic field $H < H_c$, and $I_n$ is equal to a value of current through said series circuit for generating a magnetic field which, in combination with said magnetic field $H_a$, produces a net magnetic field $H > H_c$.

References Cited in the file of this patent

UNITED STATES PATENTS 2,725,474    Ericsson _____ Nov. 29, 1955

OTHER REFERENCES

Buck: The Cryotron—A Superconductive Computer Component, I.R.E. Proceedings, April 1956, pp. 482–493.